US005655826A

United States Patent [19]

Kouno et al.

[11] Patent Number: 5,655,826

[45] Date of Patent: Aug. 12, 1997

[54] ILLUMINABLE PUSH BUTTON SWITCHING UNIT

[75] Inventors: Fumio Kouno; Sadao Nakano, both of Nagano-ken, Japan

[73] Assignee: Shin-Etsu Polymer Co., Ltd., Tokyo, Japan

[21] Appl. No.: 621,027

[22] Filed: Mar. 22, 1996

[30] Foreign Application Priority Data

Mar. 29, 1995 [JP] Japan .................................... 7-094264

[51] Int. Cl.$^6$ ...................................................... H04M 1/22

[52] U.S. Cl. ................................ 362/24; 362/84; 362/88; 200/314

[58] Field of Search ................................ 362/24, 88, 84; 200/314

[56] References Cited

U.S. PATENT DOCUMENTS 4,710,597 12/1987 Loheac .................................... 200/314

5,073,843 12/1991 Magee ....................................... 362/84

*Primary Examiner*—Carroll B. Dority

*Attorney, Agent, or Firm*—McAulay Fisher Nissen Goldberg & Kiel, LLP

[57] ABSTRACT

An improved push button switching unit is proposed of which the indicia on the key top is recognizable even in a dark place. Namely, a phosphorescent layer emitting phosphorescence even in a dark place is formed on the upper surface of the key top to provide recognizability of the indicia and further the switching unit is provided with a light sensor means and a light source which is lighted when the ambient lightness is low as detected by the sensor means. When the switching unit is used continuously in a dark place, the light source repeats cycles of a lighting period, in which the phosphorescent layer accumulates the energy of light, and a dark period, in which the phosphorescent layer emits phosphorescence by means of the accumulated energy, so that the power consumption for lighting the light source can be saved.

6 Claims, 2 Drawing Sheets

ILLUMINABLE PUSH BUTTON SWITCHING UNIT

BACKGROUND OF THE INVENTION

The present invention relates to a switching unit used in pocketable telephones, car-borne telephones, remote controllers, handy terminals and the like or, more particularly, to an illuminable push button switching unit with a covering member having self-illuminated key tops containing a luminescent material such as a phosphorescent pigment and the like mounted on a circuit board.

The push button switching unit in pocketable telephones and the like is constituted of an encased assembly of a circuit board and a covering member mounted thereon. Generally speaking, such a covering member has, on the upper surface, a plurality of key top parts each of which has an indicia such as letters, signs, symbols and the like formed on the upper surface and a movable contact point on the lower surface thereof to correspond to the respective key tops. When the key top is pressed down with the fingertip of an operator, the movable contact point on the lower surface of the key top is brought into contact with the fixed contact points on the circuit board either directly or indirectly with intervention of a film having a printed electroconductive pattern so as to close the electric circuit. It is conventional that, in a push button switching unit of this type, a large number or, for example, from around 10 to 15 pieces of light sources such as LEDs and the like are mounted in the lower part of the covering member to internally illuminate the indicias in order to increase recognizability thereof.

In the conventional internally illuminable push button switching units, however, it is a difficult matter to evenly illuminate the indicias on the top surfaces of all of the key tops and unevenness is unavoidable in the illumination and brightness of the illuminated indicias. In addition, a problem is encountered in the large electric power consumption because a large number of LEDs are simultaneous lighted and, since illumination of the indicias is limited only to the moment when the switching unit is under operation, difficulties are encountered in the recognition of the indicias when the switching unit must be handled in a dark place or in night.

The latter problem can be solved, needless to say, by lighting the LEDs constantly throughout but this way causes another problem that the power consumption is further increased resulting in shortening of the operating duration of the instrument such as pocketable telephones or requirement for a battery pack of a large capacity with an unavoidable increase in the weight of the instrument.

SUMMARY OF THE INVENTION

The present invention accordingly has an object, in view of the above described problems in the prior art push button switching units, to provide a novel and improved push button switching unit in which the indicias can be easily recognized even in night or in a dark place with so small power consumption that the battery pack and the like therein can be of a compact size.

Thus, the illuminable push button switching unit provided by the present invention is characterized in that, in an illuminable push button switching unit consisting of, as encased in a case, an assembly of a circuit board and a covering member having an indicia formed on the upper surface of the key top and mounted on one surface of the circuit board, said covering member is formed from a light-transmitting material, a phosphorescent layer containing a phosphorescent pigment to emit phosphorescence of such an intensity that the indicia is recognizable with the phosphorescent light emitted therefrom being formed on the surface thereof in the area corresponding to the indicia on the key top, and a light sensor means for detecting the ambient lightness and a light source are contained in the case, said light sensor means detecting the ambient lightness and the light source being lighted by means of the output signals of the light sensor means to illuminate the phosphorescent layer by the output of the light sensor means when the ambient lightness is low.

DETAIL DESCRIPTION OF THE PREFERRED EMBODIMENTS

Figure 1:
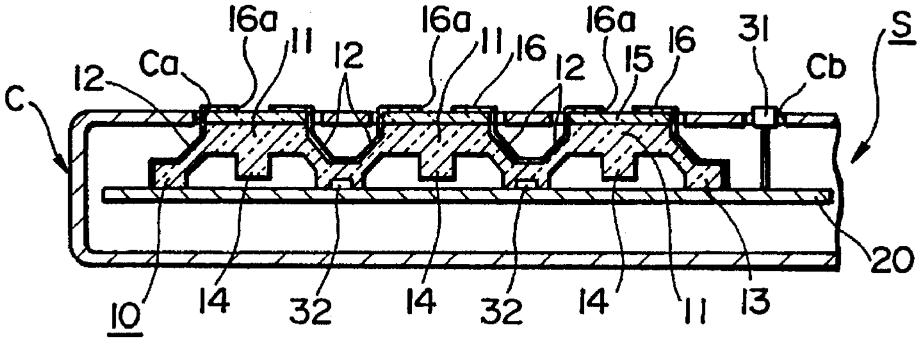
FIG. 1 is a schematic vertical cross sectional view showing the main part of the illuminable push button switching unit according to an embodiment of the present invention.

As is described above, the present invention proposes an illuminable push button switching unit comprising a circuit board and a covering member having an indicia formed on the top surface of the key top and mounted on the circuit board as encased in a case, in which a phosphorescent layer containing a phosphorescent pigment to emit phosphorescence of such an intensity that the indicia is recognizable with the phosphorescent light emitted therefrom is formed on the surface thereof in the area corresponding to the indicia on the key top, and a light sensor means for detecting the ambient lightness and a light source are contained in the case, said light sensor means detecting the ambient lightness and the light source being lighted by means of the output of the light sensor means to illuminate the phosphorescent layer by the output of the light sensor means when the ambient lightness is low.

The covering member in the inventive push button switching unit according to a first embodiment consists of an integral base body of a base plate, a key top part and a riser part, which connects the base plate and the key top part to form a dome-like protrusion, and a movable contact point bonded to the lower surface of the key top part. The base body is made from a light-transmitting rubbery resilient material. In an embodiment, a phosphorescent layer containing a phosphorescent pigment is formed on the upper surface of the key top part and a colored or light-shielding layer to serve as an indicia-forming layer is laminated on either surface of the phosphorescent layer. In this embodiment, the light sources are disposed between the base plate of the covering member and the circuit board below.

In a second embodiment of the inventive illuminable push button switching unit, the covering member has a sheet member and a phosphorescent layer is formed on the upper or lower surface of the sheet member or on the upper surface of the key top part and a colored or light-shielding indicia-forming layer is formed on the upper or lower surface of the luminescent layer along with intervention of a light-conducting part of a light-transmitting material between the sheet member and the circuit board, the light sources being disposed in the vicinity of the light-conducting part.

In a third embodiment, the inventive illuminable push button switching unit is provided with a mechanism which controls the light sources to be lighted periodically repeating the cycle consisting of a lighting period of a first specified length and a dark period of a second specified length. It is optional that the base body of the covering member in the inventive push button switching unit is formed from a light-transmitting rubbery or resinous material compounded with a phosphorescent pigment.

The phosphorescent pigment used in the present invention is a luminescent pigment which emits an afterglow over a length of time of at least several tens of minutes after termination of irradiation with actinic rays such as ultraviolet or visible light for the excitation of the phosphor.

In the illuminable push button switching unit of the invention, the phosphorescent layer emits luminescence under lighting, for example, with daylight along with absorption and accumulation of energy by which the phosphorescent layer can emit phosphorescence even in a dark place showing the phenomenon of so-called afterglow so that the recognizability of the indicia on the key top is ensured and the battery pack as the power source of the light sources can be very compact due to the decrease in the power consumption. The power consumption for the light sources can be further decreased by the repetition of the cycles of a lighting period and a dark period.

In the first embodiment described above, the light sources are disposed between the base plate of the covering member and the circuit board so that the phosphorescent layer can be illuminated with a relatively small number of light sources. The switching unit of the second embodiment described above is useful when decrease in the thickness of the instrument such as pocketable telephones is desired. Namely, the phosphorescent layer can be evenly illuminated even when the thickness of the casing is small.

In the following, description is given of the illuminable push button switching unit of the invention by making reference to the accompanying drawing, of which FIG. 1 is a schematic vertical cross sectional view of the main part of the inventive push button switching unit.

In FIG. 1, the casing C of the instrument such as pocketable telephones contains an illuminable push button switching unit S comprising a circuit board 20 and a covering member 10 mounted on the circuit board 20. Though not shown in the figure, the circuit board 20 is provided with electronic devices and an electroconductive pattern consisting of circuit wirings and pairs of fixed contact points which serve to close and open the respective circuits by contacting and lifting of the movable contact point 14.

The covering member 10 is an integral body consisting of a base body including a plurality of switching units each formed of a base plate 13 mounted on the circuit board 20, a key top part 11, to the lower surface of which a movable contact point 14 is bonded, and a riser part 12 to form a dome-like protrusion by connecting the key top 12 and base plate 13. When the key top 11 is pressed down by the fingertip of an operator, the riser part 12 causes clicking or buckling so that the movable contact point 14 is brought into contact with a pair of the contact points (not shown in the figure) on the circuit board 20 so as to close the electric circuit while, when the key top 11 is released from the pushing force, the riser part 12 regains the undepressed disposition pulling apart the movable contact point 14 from the fixed contact points so as to open the electric circuit.

The base body of the covering member 10 is made from a transparent rubbery material and integrally molded together with the movable contact points 14 by the method of compression molding or injection molding. The rubbery material is preferably a silicone rubber composition capable of giving a vulcanizate having a Rockwell hardness (IRHD) not exceeding 80 and an impact resilience of at least 40%.

It is of course possible to form a part of the key top 11 of the covering member 10 from a resinous material having a higher hardness. When the movable contact point 14 is brought into direct contact with the fixed contact points on the circuit board 20, the movable contact point 14 alone or the covering member as a whole is made from an electroconductive material while, when the fixed contact points on the circuit board 20 are connected by a sheet having a printed electroconductive pattern intervening between the covering member 10 and the circuit board 20, the covering member 10 can be made as a whole from an insulating material.

The key top 11 of the covering member 10 is protruded from the opening Ca of the case C and a phosphorescent layer 15 is formed on the upper surface of the key top 11 either by integral molding or by adhesive bonding of a phosphorescent sheet separately prepared by using a suitable adhesive. The upper surface of the key top 11 is covered as a whole with a light-shielding layer 16 having an openwork 16*a* corresponding to the pattern of the indicia indicating the function of the particular key top. The phosphorescent layer 15 is formed from a transparent or translucent silicone rubber or silicone resin as the matrix compounded with, for example, from 5 to 30% by weight of a phosphorescent pigment based on the amount of the matrix rubber or resin.

Various kinds of phosphorescent pigments in the form of a fine powder can be used. Though not particularly limitative, the color of luminescence emitted from the phosphorescent pigment is preferably light yellow or yellowish green having a wavelength of around 530 nm because the light in this wavelength range is felt by the human eyes to have the highest brightness as compared with lights of other colors. In particular, copper-activated zinc sulfide-based phosphorescent phosphors (ZnS:Cu) and bismuth-activated calcium sulfide-based phosphorescent pigments (CaS:Bi) as well as those disclosed in Japanese Patent Kokai 7-11250 are satisfactory. It is more preferable that the phosphorescent pigment is a phosphor of strontium aluminate as the host activated by a lanthanoid element Ln such as europium and dysprosium expressed by the formula $SrAl_2O_4$:Ln. Although the phosphor should have a relatively large particle size since it is known that the brightness of a phosphorescent pigment is increased as the particle size thereof is increased, the average particle size thereof is selected usually in the range from 19 to 25 μ m in consideration of the balance with the dispersibility and workability.

The transparent or translucent resin from which the phosphorescent layer 15 is formed is not limited to silicone resins but can be selected from other thermoplastic and thermosetting resins including acrylic resins, ABS resins, polycarbonate resins, methacrylic resins, urethane resins, phenolic resins and the like. The blending amount of the phosphorescent pigment with the matrix resin is about 5 to 30% by weight based on the matrix resin though dependent on various factors. When a high brightness is desired of the phosphorescent layer 15, it is preferable to increase the thickness of the layer 15 or to increase the blending proportion of the phosphorescent pigment therein along with selection of a highly transparent resin.

Figure 3:
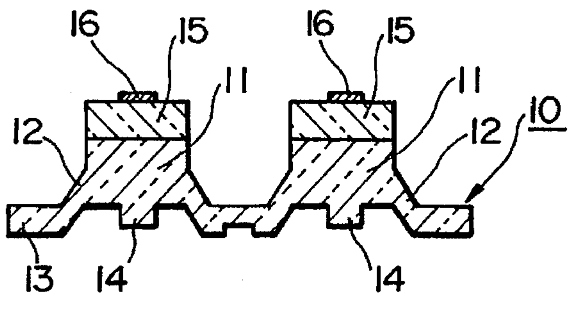
FIG. 3 is a partial enlargement of an illuminable push button switching unit showing a further different embodiment from that of FIG. 1.

The indicia-forming layer 16 is formed from an opaque material or a colored material and an openwork 16*a* for the indicia is formed in the light-shielding layer 16 by using a suitable engraving machine such as laser beam markers and the like. It is of course not always necessary that the light-shielding layer 16 is formed on all over the upper surface of the covering member 10 but can be formed to cover the phosphorescent layer 15 alone on the upper surface of the key top 11. Instead of forming an indicia with an openwork, it is optional that the light-shielding layer 16 is formed in the form of the indicia by adhesively bonding a patterned piece prepared separately as is shown in FIG. 3 by a vertical cross sectional view instead of forming an openwork 16*a*. It is optional to form the indicia-forming layer 16 by the method of screen printing and the like with a light-shielding ink. When the phosphorescent layer 15 on the upper surface of the key top 11 is formed in the pattern of an indicia, it is of course that the light-shielding layer 16 thereon can be omitted.

The illuminable push button switching unit illustrated in FIG. 1 is provided with a light sensor 31 and a plurality of light sources 32 such as LEDs or miniature lamps. The light sensor 31 is disposed at or within an opening Cb formed in the upper wall of the case C so that the light sensor 31 can detect the ambient lightness such as illuminance and the like to generate signals corresponding to the lightness, which are inputted to the control circuit on the circuit board 20. Each of the light sources 32, which is connected to a power source such as a battery pack (not shown in the figure) and the like through a driving circuit on the circuit board 20, is disposed between the circuit board 20 and the base plate 13 of the covering member 10 and lighted by the power source according to the output of the control circuit which drives the driving circuit.

As is described later in detail, the light source 32 is not lighted when the ambient lightness is high around the case C while, when the ambient lightness is low, the light source 32 is lighted intermittently by repeating the cycles of the lighting period of a first specified length of, for example, about 30 minutes and the dark period of a second specified length of, for example, about 3 hours depending on the performance of the phosphorescent pigment contained in the phosphorescent layer 15.

Although the type of the light source 32 is not particularly limitative and can be selected from various types, it is preferable that the light emitted from the light source 32 has a relatively short wavelength, for example, in the range from 300 to 500 nm because the phosphorescent pigment can be excited efficiently by a short wavelength light including ultraviolet.

In the above described embodiment of the invention, the phosphorescent layer 15 is formed on the upper surface of the key top 11 of the covering member 10 and the indicia-forming layer 16 having an openwork 16*a* to give the indicia is formed on the phosphorescent layer 15. When the ambient lightness is low, the phosphorescent layer 15 is illuminated by the light source 32 provided at a position to enable illumination of the phosphorescent layer 15 so as to increase the recognizability of the indicia 16*a* with a relatively small power consumption for lighting. The power consumption for lighting can be further decreased because of the intermittent lighting of the light source 32 not to consume the electric power during the period when afterglow is emitted from the phosphorescent layer 15 lasting, for example, for 3 hours following the lighting period of, for example, about 30 minutes.

Figure 4:
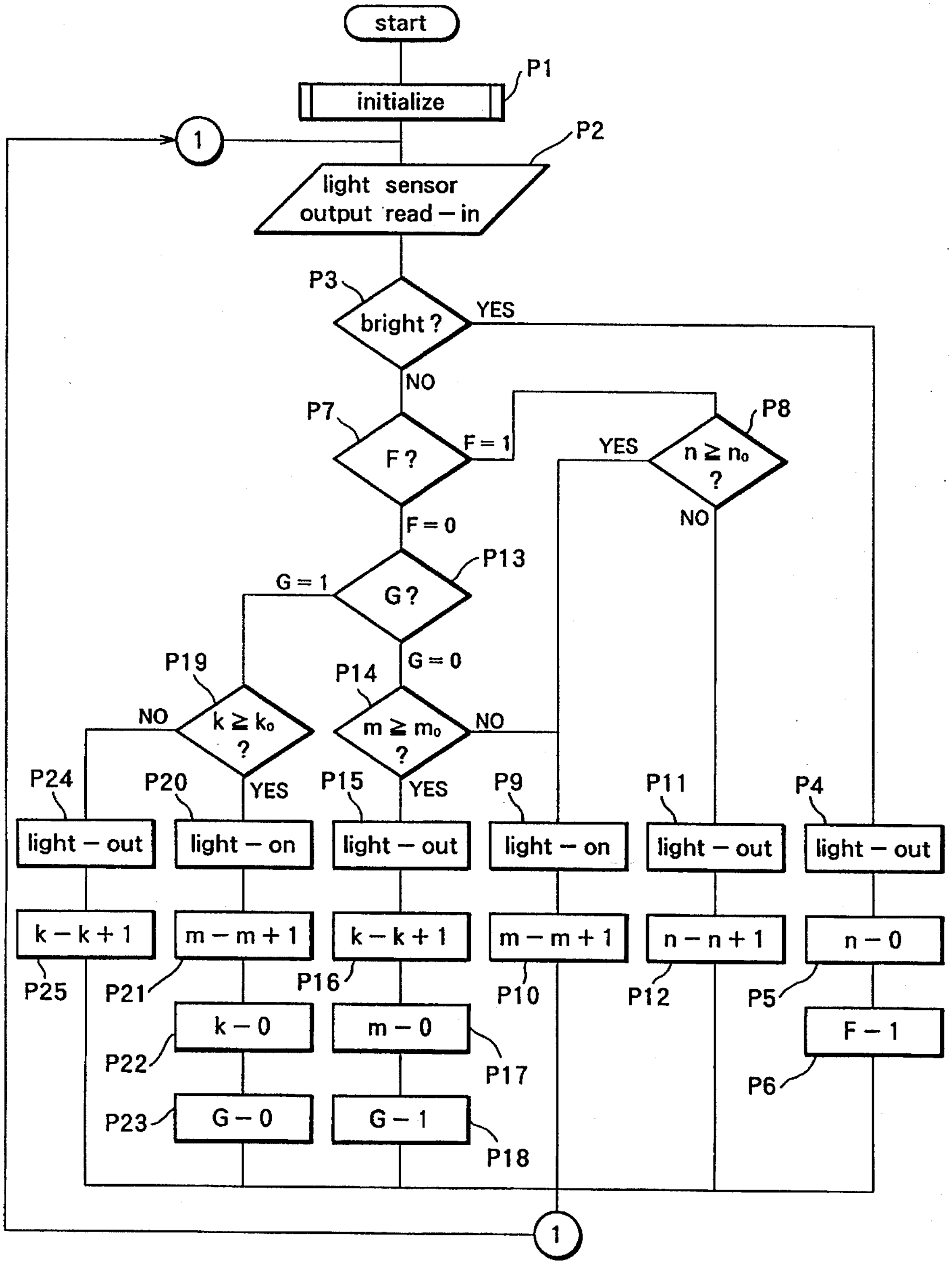
FIG. 4 is a block diagram showing the principle of controlling the afterglow in the illuminable push button switching unit according to the present invention.

The light source 32 is intermittently lighted under a lighting control means by repeating the processing scheme shown in the block diagram of FIG. 4 in a specified period. As is shown in the diagram, namely, step P1 for the initialization is followed by step P2 for read-in of the output signals of the light sensor 31 to determine, in step P3, the ambient lightness which may be lower or higher than a preset value. When the ambient lightness is higher than the preset value, the light source 32 is turned out in step P4 by opening the circuit to the light source 32 followed by resetting of the first counter n in step P5 and setting of the lightness flag F at 1 in step P6. Incidentally, the initial setting of this lightness flag F and the flag G described later is 0.

When the ambient lightness is determined to be lower than the preset value in step P3, the value of flag F is determined in step P7 and, if the value of the flag F is 1, the counting time of the first counter n is determined in step P8 to be either above or below the specified length of time while, if the value of the flag F is 0, the value of the lighting flag G is determined in step P13. When, in step P8, the counting time of the first counter n is determined to be equal to or longer than the preset time $n_0$, the light source 32 is turned on in step P9 and the lighting time thereof is counted in step P10 by the second counter m while, when the counting time of the first counter n is determined to be less than the preset time $n_0$, the power to the light source 32 is turned off in step P11 and the dark time is counted by the first counter n in step P12. Namely, the light source 32 is lighted only after the dark period has exceeded the specified length of time n.

On the other hand, if the value of the flag G is determined to be 0 in step P13, the counting time of the second counter m or, i.e. the lighting time, is determined in step P14 while, if the value of the flag G is determined to be 1, the counting time of the third counter k or, i.e. the dark time, is determined in step P19. When, in step P14, the counting time of the second counter m is determined to exceed the preset period $m_0$, which is 30 minutes in the above given description, the light source 32 is turned off in step P15 and counting of the dark time is started in step P15 by the third counter k along with resetting of the second counter m in step P17 and setting of the flag G at 1 in step P18. If the counting time of the second counter m is determined in step P14 to be less than the preset period $m_0$, lighting of the light source 32 is continued in steps P9 and P10 to count the lighting time. Namely, the light source 32 is turned off when the lighting time reaches a preset lighting period $m_0$.

When in step P19, the counting time of the third counter k, i.e. the dark time, is determined to exceed the preset period $k_0$, which is 3 hours in the above given description, the processing from step P20 to step P23 is conducted while, when the counting time of the third counter k is determined to be less than the preset period $k_0$, the processing of step P24 and step P25 is conducted. The light source 32 is lighted in step P20, counting of the lighting time is started in step P21 by the second counter m, the third counter k is reset in step P22 and the flag G is set at 0 in step P23. When the dark time exceeds the preset period $k_0$, the light source 32 is lighted again. Further, in step P24, the light source 24 is turned off and the dark time is counted in step P25. Thereafter, the processing from step P2 is conducted repeatedly.

It is possible for a pocketable telephone having the illuminable push button switching unit built therein to have a system by which the light sources are lighted in the arrival of a call and lighting is continued for a specified length of time, for example, until the end of the telephone conversation. It is also possible to light the light sources only in the presence of a person in the vicinity of the telephone which can be detected by means of an infrared sensor. The power consumption by the switching unit can be further decreased by undertaking these measures.

Figure 2:
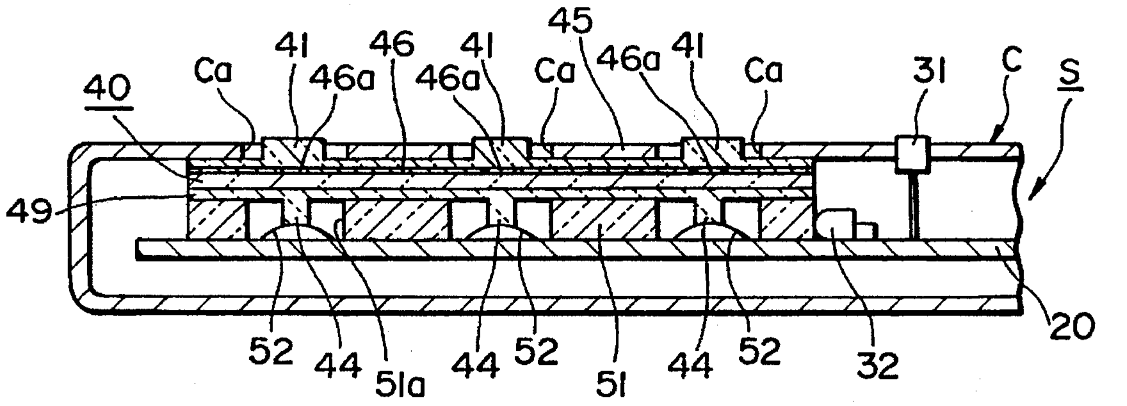
FIG. 2 is a schematic vertical cross sectional view showing the main part of the illuminable push button switching unit according to another embodiment of the present invention.

FIG. 2 is a schematic vertical cross sectional view of the illuminable push button switching unit according to another embodiment of the invention, in which a sheet member 49 is laminated with a phosphorescent layer 45 and a plurality of key tops 41 are mounted thereon with intervention of an indicia-forming layer 46 having openworks 46*a* corresponding to the respective indicias while downward, presser heads 44 are integrally bonded to the lower surface of the sheet member 49 at the positions just to oppose to the respective key tops 41 to form a covering member 40. The sheet member 49, key tops 41 and contact points constituting the covering member 40 are made from a light-transmitting material while the phosphorescent layer 45 is formed from a resin composition containing a phosphorescent pigment and provided with openworks 46*a* to give indicias.

The covering member 40 is mounted on the circuit board 20 with intervention of a light-conducting plate 51 therebetween and the presser head 44 comes at the lower end thereof into contact with the circuit board 20 with intervention of a diaphragm 52, which bears a movable contact point (not shown in the figure) on the lower surface thereof and serves as a click plate, therebetween. The light-conducting plate 51 is made from a light-transmitting material and has a plurality of openings 51*a*, in each of which the above mentioned diaphragm 52 is disposed. A light source 32 is mounted to be close to the outer periphery thereof.

It is also possible in the above described embodiment illustrated in FIG. 2 to form the phosphorescent layer 45 and the indicia-forming layer 46 on the upper surface of the key top 41. It is further possible that the lamination of the phosphorescent layer 45, the indicia-forming layer 46 and the like serves as the sheet member 49. The key top 41 can be formed from a synthetic rubber such as silicone rubbers to have a rubbery touch feeling or can be formed from a rigid resin. The phosphorescent layer 45 is formed preferably from a transparent or translucent synthetic rubber such as silicone rubbers having excellent stress-strain characteristics and fatigue resistance and compounded with a phosphorescent pigment in order to comply with the requirement that the diaphragm 52 is pushed down to be brought into contact with the circuit board 20.

In this embodiment also, like the previously described embodiment illustrated in FIG. 1, the ambient lightness outside of the case C is detected by means of the light sensor 31 and, if the ambient lightness is lower than the preset value, the processing according to the block diagram of FIG. 4 is performed so that good recognizability can be obtained of the indicias 46*a* with a greatly decreased power consumption.

Following is a detailed description of a particular example of the embodiment illustrated in FIG. 1.

In the First place, two kinds of phosphorescent rubber compositions exhibiting different colors were prepared by compounding a low temperature-curable liquid silicone rubber composition (KE 1935, a product by Shin-Etsu Chemical Co.) with a green-emitting phosphorescent pigment or red-emitting phosphorescent pigment (GSS-Green and GSS-Red, respectively, each a product by Nemoto & Co., Ltd.) and each of the liquid rubber compositions was poured into the cavities of a metal mold for key tops in a thickness of 1 mm followed by curing therein to give a phosphorescent layers 15.

In the next place, a covering member 10 having the phosphorescent layers 15 was shaped by compression molding of another silicone rubber composition (KE 1915, a product by Shin-Etsu Chemical Co.) in the metal mold containing the above prepared phosphorescent layers 15 in the cavities. Thereafter, an indicia-forming layer 16 was formed on each of the key tops 11 of the thus obtained covering member 10 and engraved by a laser beam marker to form openworks 16*a* along the contours of the respective indicias. This covering member 10 was mounted on a circuit board 20 to give an assembly which was encased in a case C. Four light sources of LEDs were mounted on the circuit board 20 each between the base plate 13 of the covering member 10 and the circuit board 20. A light sensor 31 was also mounted on the circuit board 20 to detect the ambient lightness by appearing in the opening Cb in the upper wall of the case C.

The above described illuminable push button switching unit as a particular example of the present invention as encased in a case was subjected to an actual outdoor application test under daylight to give a result that the recognizability of the indicias such as letters and symbols was excellent without any problems and the LEDs as the light source 32 were never lighted despite insufficient ambient lightness detected by the light sensor 31. When the switching unit was placed in a dark place, phosphorescence was emitted by the phosphorescent pigment contained in the phosphorescent layer 15 to give good recognizability of the indicias 15 along with lighting of the LEDs 32 due to the low ambient lightness detected by the light sensor 31 by which the phosphorescent layer 15 was illuminated from the lower surface lastingly for about 30 minutes. Thereafter, the LEDs were turned out and a dark period lasted for about 2 hours, during which, however, emission of phosphorescence by the phosphorescent layer 15 was continued so that good recognizability of the indicias 16*a* was not lost.

What is claimed is:

1. An illuminable push button switching unit comprising, as encased in a case, an assembly of a circuit board and a covering member made from a light-transmitting material, which consists of a base plate, key top, riser part to connect the base plate and the key top forming a dome-like protrusion and a movable contact point on the lower surface of the key top, having an indicia formed on the upper surface of the key top, and mounted on one surface of the circuit board: which further comprises:

- a phosphorescent layer containing a phosphorescent pigment, capable of emitting phosphorescent light of such an intensity that the indicia on the key top is recognizable with the phosphorescent light emitted therefrom, in an area corresponding to the indicia on the key top;
- a light sensor means in the case for detecting the ambient lightness; and
- a light source in the case capable of illuminating the phosphorescent layer, which is lighted on and out by the output signals of the light sensor means.

2. The illuminable push button switching unit as claimed in claim 1 in which the phosphorescent layer is covered with an indicia-forming layer of a colored or light-shielding material having an openwork in the form of the indicia.

3. The illuminable push button switching unit as claimed in claim 1 which further comprises a control circuit capable of controlling lighting of the light source to repeat cycles consisting of a lighting period and a dark period when the ambient lightness is low.

4. An illuminable push button switching unit comprising, as encased in a case, an assembly of a circuit board, a covering member made from a light-transmitting material, which comprises a key top, a sheet member, a presser head and a light-conducting plate, and mounted on one surface of the circuit board and a diaphragm below the presser head:

which further comprises:

a phosphorescent layer containing a phosphorescent pigment, capable of emitting phosphorescent light of such an intensity that the indicia on the key top is recognizable with the phosphorescent light emitted therefrom, in an area corresponding to the indicia on the key top;

a light sensor means in the case for detecting the ambient lightness; and a light source in the case capable of illuminating the phosphorescent layer, which is lighted on and out by the output signals of the light sensor means.

5. The illuminable push button switching unit as claimed in claim 4 in which the phosphorescent layer is covered with an indicia-forming layer of a colored or light-shielding material having an openwork in the form of the indicia.

6. The illuminable push button switching unit as claimed in claim 4 which further comprises a control circuit capable of controlling lighting of the light source to repeat cycles consisting of a lighting period and a dark period when the ambient lightness is low.

* * * * *